P. WINAND.
METHOD OF MAINTAINING EQUALITY OF WEIGHT IN SUBMARINE BOATS WHILE IN OPERATION.
APPLICATION FILED OCT. 31, 1906.
953,881.
Patented Apr. 5, 1910.
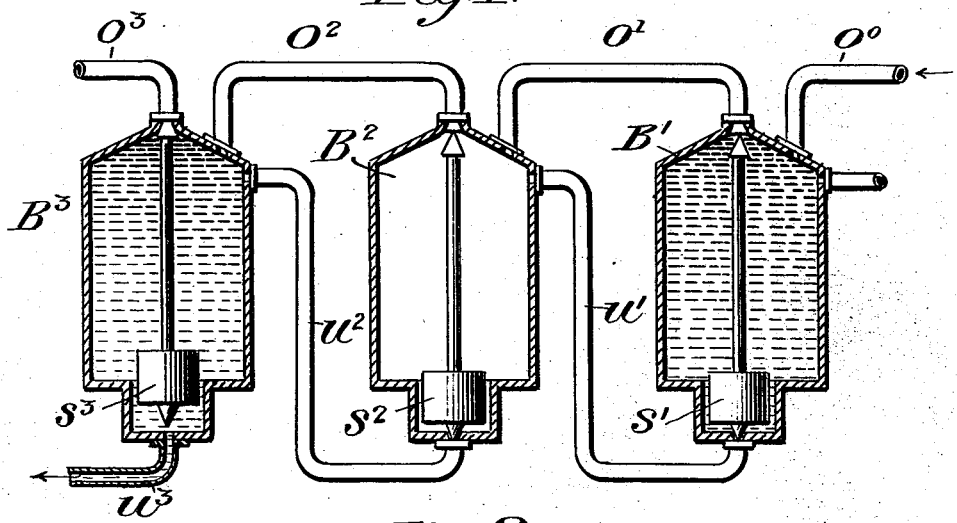
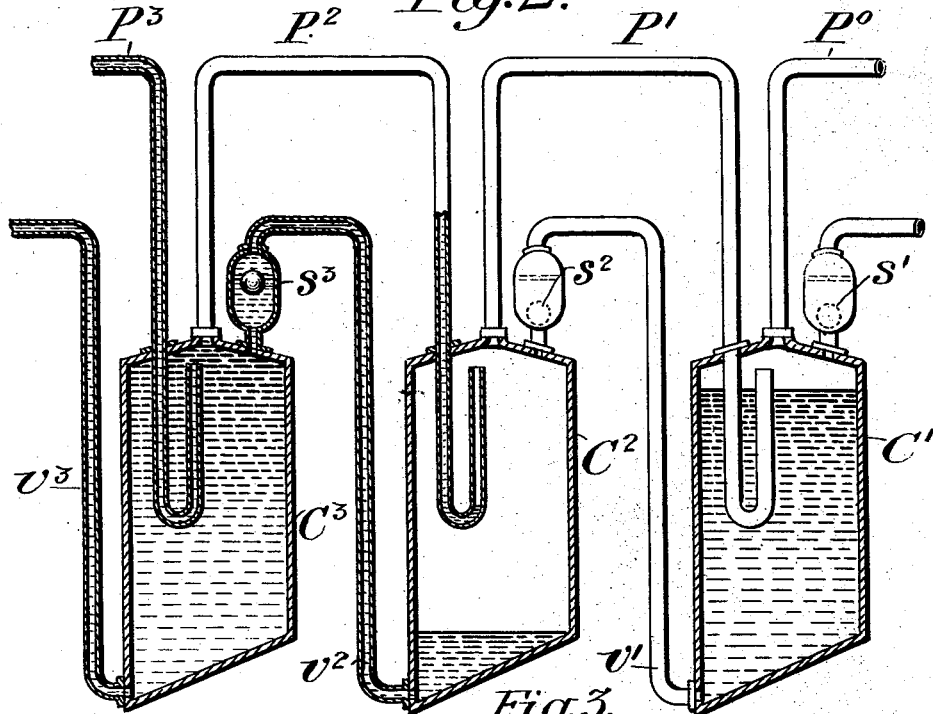
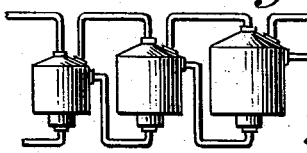
Witnesses:
D.W. Edelin
G. Burroughs
Inventor.
Paul Winand

UNITED STATES PATENT OFFICE.

PAUL WINAND, OF COLOGNE, GERMANY.

METHOD OF MAINTAINING EQUALITY OF WEIGHT IN SUBMARINE BOATS WHILE IN OPERATION.

953,881.  Specification of Letters Patent.  Patented Apr. 5, 1910.

Application filed October 31, 1906. Serial No. 341,511.

*To all whom it may concern:*

Be it known that I, PAUL WINAND, engineer, a subject of the King of Belgium, residing at 1 Sudermannstrasse, Cologne-on-the-Rhine, Germany, have invented certain new and useful Improvements in Methods of Maintaining Equality of Weight in Submarine Boats While in Operation; and I do hereby declare the following to be a full, clear, and exact description of the invention, such as will enable others skilled in the art to which it appertains to make and use the same.

In the accompanying drawings: Figure 1 illustrates, in section, an arrangement for properly practicing the invention; Fig. 2 is a similar view, showing a modified form of apparatus. Fig. 3 is a side elevation of an arrangement of the apparatus showing the tanks of successively decreasing volumes.

It is well known that it is important to keep the total weight of a submarine boat unchanged while in operation. To effect this result the weight of the substances consumed during the operation has to be replaced by an equal weight of water taken from the surrounding water and it has been proposed to use the vessels containing the substances employed for operating the boat to receive this counterbalancing water and to displace, gradually, the substance to be consumed by means of the water in case the substances are not soluble in water.

The present invention relates to a method which permits the use of the vessels containing the substances employed in operating the boat, for receiving the counterbalancing water when the said substances are soluble in water, and said method contemplates the interposition of a suitable medium between the substances and the displacing water to keep them separated, said medium preferably being one insoluble in either the substance or the water. The simplest mode of carrying out this method is to use as intermediate body a medium which follows the consumed substance at the rate of its consumption under the influence of the pressure of the inflowing water. In case the substance has a higher specific weight than water the volume of water to be introduced is greater than the volume of the substance consumed. Another mode consists in making use of an intermediate layer of a fluid of such a nature that it is practically insoluble in the consumed substance, as well as in water and that has a specific gravity intermediate those of the two other bodies, as is, for example, the case when mineral oil is used as an intermediate substance with alcohol as fuel. This intermediate substance is introduced first in sufficient quantity after which the water may be admitted. If the vessel is subjected to oscillating motions a mixing of the liquids might result if the separating surface has a considerable area. A gas may also be used to form an intermediate layer between the substance being consumed and the water replacing the same. In this case the consumed substance should be distributed among a number of vessels which are emptied in succession and which are successively filled with water as they become empty. If the consumed substance is specifically heavier than water, one or more of the vessels should not be filled therewith, in order that the total weight may be maintained unchanged. In using $NO_2$, for example, whose specific gravity is 1.4, only 7 out of 11 equal vessels should be filled originally with $NO_2$, while finally 10 vessels would be filled with water and 1 remain empty. It is particularly desirable, however, not to make all the vessels of the same size, but to have them of successively smaller size in the order in which they are emptied, as conventionally illustrated in Fig. 3. By employing this arrangement of vessels the unemployed volume or space may be reduced to a minimum, to wit, when each subsequent vessel is made smaller than the preceding one in the same proportion as the specific gravities of the water and the consumed substance. When using $NO_2$, for example, each vessel should be 1.4 times smaller than the preceding one, so that if six vessels be employed the summation of the individual volumes of the successive vessels is represented by $1+1.4+2.0+2.8+3.8+5.4=16.4$.

At the beginning, only the largest vessel having a relative volume of 5.4 is empty, and inasmuch as this vessel never contains any of the consumed substance, it need not fulfil the same conditions as the other vessels containing the substance in respect of shape, material and location; at the finish only the smallest vessel having a volume of 1, that is to say 6% of the total volume of the vessels, will be empty and therefore constitute an unemployed space. If the upper part of each vessel is connected to the lower part of the subsequent one by means of a small pipe the liquid will be effectively displaced by air or by the vapors of the liquid, as the case may be.

When several vessels are being used, the operation may be as follows: All vessels being connected together in one series, water is introduced in the first one which is empty up to that time, while the substance consumed is taken out of the last one of the series, and, meanwhile, the air that serves as an intermediate body passes gradually from one vessel into the next one in succession. It is necessary however to interpose certain regulating or distributing devices between the vessels in order to prevent the water or the air from mixing with the consumed substance. A simple solution of the problem of the interconnection consists in connecting the upper and lower part of each vessel with the next one in such a way that the lower connection is kept open and the upper one shut as long as there is liquid in both vessels and that, by means of a float, the lower connection is closed and the upper one opened as soon as the first of the two vessels becomes empty.

Figs. 1 and 2 illustrate different arrangements of the interconnection. In Fig. 1, showing 3 of the vessels; $B_1$, contains water, $B_2$ air and $B_3$ the liquid consumed, $u_1$, $u_2$, $u_3$, are the lower, $O_1$, $O_2$, $O_3$ the upper connections. Each vessel carries a float $S_1$, $S_2$, $S_3$, whose specific gravity is intermediate that of water and that of the liquid, which in the present case is supposed to be heavier than water. In vessels $B_1$ and $B_2$ the float is therefore in its lower position, in vessel $B_3$ in its upper position. Each float is provided at its top and bottom with a valve which, in its lower position, closes the lower connection $u_1$ and $u_2$ (in $B_1$ and $B_2$) and, in its upper position the upper connection $O_3$ (in $B_3$). If water is now introduced in $B_1$ (through $O_0$) it passes farther on through $O_1$ into $B_2$ and displaces the air contained in the latter into $B_3$ through $O_2$. The liquid contained in $B_3$ is displaced through the lower connection $u_3$ into the next vessel until the surface of the liquid reaches the float. The float then descends closing $u_3$ and opening $O_3$ so that the air may enter the next vessel and displace the liquid contained therein. Fig. 2 shows another arrangement of apparatus for accomplishing the same result and including a series of interconnected tanks as $C_1$, $C_2$, $C_3$. The upper connection between successive tanks is effected by open pipes so constructed that the liquid therein forms a seal. The connections from the bottom of each tank to the top of the next one contain floating balls $s_1$, $s_2$, $s_3$ which act as valves when they descend and engage seats underneath. The upper connections $P_0$, $P_1$, $P_2$, etc., will, of necessity, be carried to a greater height and be longer than the lower connections $v_1$, $v_2$, $v_3$, etc., so that when both pipes are open to the passage of fluid, the latter will pass through the lower pipes which offer less hydrostatic resistance than the upper pipes. Under conditions of operation shown in Fig. 2 the balls $s_1$ and $s_2$ have closed the connections from the bottoms of the preceding tanks while the ball $s_3$ floats in the liquid and therefore does not rest on its seat. The upper connections $P_0$ and $P_1$ being open, water passes through the first one into $C_1$ and air passes through the second one into $C_2$. This air displaces the liquid through $v_2$ into the next vessel because $P_2$ is shut or sealed by the liquid remaining therein. Not until $C_2$ is entirely emptied and until air reaches the ball $s_3$ does the latter descend on its seat and close $v_2$. The pressure consequently rises in $C_2$ and, through this rise of pressure, the liquid contained in $P_2$ and forming a seal therein is forced out of same, that is, the liquid seal gives way, and the air can pass into $C_3$ through $P_2$.

What I claim is:

1. The method of compensating for weight of liquid substances consumed in operating submarine boats, which consists in replacing the consumed substances by water from without the boat, and interposing between the water and the said substances a body insoluble in both.

2. The method of compensating for weight of liquid substances consumed in operating submarine boats, which consists in replacing the consumed substances by water from without the boat, and interposing between the water and the said substances a movable transferring medium which prevents the intermingling of the substance and the water.

3. The method of compensating for weight of liquid substances consumed in operating submarine boats, which consists in replacing the consumed substances by water from without the boat, and interposing between the water and the said substances a fluid body insoluble in both.

4. The method of compensating for weight of liquid substances consumed in operating submarine boats, which consists in subdividing the containers for the consumed substance into compartments or units, replacing the consumed substances by water from without the boat, and interposing between the water and the said substances a fluid body insoluble in both.

5. The method of compensating for weight of liquid substances consumed in operating submarine boats, which consists in subdividing the containers for the consumed substance into compartments or units, replacing the substance in said compartments or units successively by water from without the boat, and interposing between the water and the consumed substance a fluid body insoluble in both.

6. The method of compensating for weight of liquid substances consumed in operating submarine boats, which consists in subdividing the containers for the consumed substance into compartments or units, each of which bears a volumetric ratio to that next in the series substantially equal to the ratio of the specific gravities of the water and the substance consumed emptying the vessels of the said substance successively, replacing the substance by water from without the boat, and interposing between the water and the consumed substance a fluid body insoluble in both.

7. Apparatus for compensating for weight of liquid substances consumed in operating submarine boats in which said substances are replaced by water from without the boat, comprising a series of vessels or receptacles to receive the substance and then the water, connections from the lower part of each vessel to the next in the series, connections between the upper portions of successive vessels, a body of air or other fluid between the substance consumed and the replacing water, and means for controlling the flow of the substance consumed, the intermediate fluid medium and the water to and from the several vessels of the series to maintain the relation specified.

8. Apparatus for compensating for weight of liquid substances consumed in operating submarine boats in which said substances are replaced by water from without the boat, comprising a series of vessels or receptacles to receive the substance and then the water, connections from the lower part of each vessel to the next in the series, connections between the upper portions of successive vessels, a body of air or other fluid between the substance consumed and the replacing water, means for opening the connections from the lower portions of the vessels for the egress of the substance to be consumed and for closing the same against egress of the water, and means for opening the upper connections to the flow of the intermediate fluid and the water in succession as the respective vessels are emptied of said substance.

In testimony whereof I have affixed my signature, in presence of two witnesses.

PAUL WINAND.

Witnesses:
CHARLES LESIMPLE,
LOUIS VANDORN.